(12) United States Patent
Jamil

(10) Patent No.: US 11,021,858 B2
(45) Date of Patent: Jun. 1, 2021

(54) IMPACT REDUCER FOR DRAINAGE STACKS

(71) Applicant: Imam Abdulrahman Bin Faisal University, Dammam (SA)

(72) Inventor: Rehan Jamil, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 120 days.

(21) Appl. No.: 16/386,408

(22) Filed: Apr. 17, 2019

(65) Prior Publication Data

US 2020/0332506 A1 Oct. 22, 2020

(51) Int. Cl.
- *E03C 1/122* (2006.01)
- *F16L 43/00* (2006.01)
- *F16L 45/00* (2006.01)

(52) U.S. Cl.
CPC ............ *E03C 1/122* (2013.01); *F16L 43/00* (2013.01); *F16L 45/00* (2013.01)

(58) Field of Classification Search
CPC ............ E03C 1/122; F16L 43/00; F16L 45/00
USPC .................................................. 4/211, 256.1
See application file for complete search history.

(56) References Cited

U.S. PATENT DOCUMENTS

| 689,045 | A | | 12/1901 | Fruin et al. |
| 1,186,280 | A | | 6/1916 | Carson |
| 2,067,078 | A | * | 1/1937 | Faber ................ E03D 9/05 4/211 |
| 2,602,168 | A | | 7/1952 | Lally et al. |
| 3,346,887 | A | | 10/1967 | Sommer |
| 4,121,914 | A | * | 10/1978 | Kigawa .............. E03C 1/122 4/211 |
| 2015/0275490 | A1 | * | 10/2015 | Letcher, Jr. ......... E03C 1/122 4/255.01 |

FOREIGN PATENT DOCUMENTS

| CN | 27569429 U | 7/2018 |
| JP | 2-261136 | 10/1990 |

(Continued)

OTHER PUBLICATIONS

Inspectapedia, Free Encyclopedia of Building & Environmental Inspection, Testing, Diagnosis, Repair ; Plumbing Drain Noise ; https://web.archive.org/web/20150309053802/https:inspectapedia.com/noise_diagnosis/Plumbing_Drain_Noise_Diagnosis_php ; 2015 ; 8 pages.

(Continued)

*Primary Examiner* — Tuan N Nguyen
(74) *Attorney, Agent, or Firm* — Oblon, McClelland, Maier & Neustadt, L.L.P.

(57) ABSTRACT

An impact reducer for drainage stacks includes a first pipe section with a first internal passage having at least five alternating bends along its longitudinal axis, a bypass vent in a second pipe section having a second internal passage parallel to the longitudinal axis and a clean out plug in a third pipe section having a third internal passage at a radial angle with the longitudinal axis. First and second end fittings are located on the impact reducer for connecting the device to a drainage pipe. The impact reducer adjusts the turbulent flow of water falling in the drainage stack, converting the turbulent flow to laminar flow before the lower bend fitting of the drainage stack, which protects the lower bend fitting from impact shock.

16 Claims, 5 Drawing Sheets

FRONT VIEW SECTION

(56) References Cited

FOREIGN PATENT DOCUMENTS

JP          4-113097       4/1992
KR      10-0717121     6/2007

OTHER PUBLICATIONS

Weld -On ; Industrial Grade Cements & Primers Specification Guide ; 2015 ; 40 Pages.
ASTM International ; Standard Specification for Poly(Vinyl Chloride) (PVC) Plastic Drain, Waste, and Vent Pipe and Fittings ; Designation D 2665-04 ; 7 Pages; 2004.

\* cited by examiner

IMPACT REDUCER FOR DRAINAGE STACKS

BACKGROUND

Technical Field

The present disclosure is directed to an impact reducer for a drainage stack. The impact reducer includes a double bend and is located within the drainage stack above a pipe bend to relieve stress on pipe fittings due to impact stress.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Drainage stacks (vertical pipes) in plumbing systems for high rise buildings have a common and frequently occurring problem of leaking at the pipe fittings at the bottom of the stacks due to the heavy impact of the water falling through the drainage stack.

In high rise building drainage systems, the bend at the bottom of a vertical drainage water stack is a critical point of failure due to the impact caused when a flow of water comes from above and changes its direction from vertical flow to horizontal flow. The water at this point becomes turbulent and a hydraulic jump is developed inside the drainage pipe.

Repeated impact and turbulence caused by the flow of drainage water may cause pipe joints at this location, usually the bottom of the stack, to fail and start leaking. In some instances, the pipe fitting itself develops cracks. Such impacts may also cause noise in the pipes.

To avoid such situations, contractors or building management may have to install a heavy pipe hanging system from the ceiling at these locations to let the pipe bend absorb the physical impact of water, which is expensive and takes additional space.

The following problems are generally faced at the bottom of pipe stack due to the physical impact of falling water.

(i) Breakage of the pipe bend at the bottom of drainage stack.

(ii) Leakage at the pipe fitting at the bottom of drainage stack due to its dislocation.

(iii) Noise caused at the bends due to the heavy impact of falling water.

The following measures may be taken to avoid the abovementioned problems at the base of a drainage stack.

(i) Installation of heavy metal brackets at the base of stacks.

(ii) Installation of additional pipe clamps to keep the pipe bend in place.

(iii) Insulation around hanging pipes to decrease water falling and/or impact noise.

The aforementioned measures may entail excessive drilling in the ceiling to hang the pipe installation system, which may cause local concrete or wooden strut failure at such locations. Additionally, these measures take additional space. However, if these measures are not adopted, the pipe bend may malfunction and may need replacement or repair in a comparatively short operational duration.

A sewer pipe is normally at neutral air pressure compared to the surrounding atmosphere. When a column of waste water flows through a pipe, it compresses air ahead of it in the pipe, creating a positive pressure that must be released so it does not push back on the waste stream and downstream trap water seals. As the column of water passes, air must freely flow in behind the waste stream, or negative pressure results. The extent of these pressure fluctuations is determined by the fluid volume of the waste discharge.

Excessive negative air pressure, behind a "slug" of water that is draining, can siphon water from traps at plumbing fixtures. Generally, a toilet outlet has the shortest trap seal, making it most vulnerable to being emptied by induced siphonage. An empty trap can allow noxious sewer gases to enter a building.

On the other hand, if the air pressure within the drain becomes suddenly higher than ambient, this positive transient could cause waste water to be pushed into the fixture, breaking the trap seal, with serious hygiene and health consequences if too forceful. Tall buildings of three or more stories are particularly susceptible to this problem. Vent stacks are installed in parallel to waste stacks to allow proper venting in tall buildings.

Impact reducers have been known to be used in drainage stacks. For example, U.S. Pat. No. 689,045 describes an impact reducing fitting which may be installed at various locations within drainage pipes to ensure proper venting of the pipes and prevents the water seals of the fixture traps from breakage. A separate bypass vent chamber provides an air outlet to relieve siphon breaking of the pipe at the fitting. This reference shows bypass venting, but does not describe bends in the drainage stack for the reduction of the impact of water.

U.S. Pat. No. 1,186,280 illustrates a plumbing fitting (D) which has a single curve. This plumbing fitting is placed before the lower bend (E) of the stack (A). The lower bend is connected to a vent line (B) as shown in FIG. 1. The purpose of this fitting is to make water cling to the side walls of the pipe to keep the central core of pipe free for the upward movement of air. Unlike the impact reducer of the present disclosure, the vent line is not a part of the fitting, has only a single bend and is designed for air venting, not for reduction of water impact at the base of the stack.

JP1990261136 shows a drainage pipe having a bend 9 in the pipe 6 and a bent tube fitting (8) with a bypass vent (2). An internal blade rotates within the shaped fitting as shown in FIG. 2. The rotating blade assembly may become fouled by waste material and is prone to malfunction.

The impact reducer of the present disclosure has a multiple curved internal passage to relieve the impact of falling water in a drainage stack. The impact reducer further provides air venting to reduce noise and shock as the water impacts an air space. The impact reducer is located above a bend fitting of the drainage stack and protects the bend fitting from failure. The impact reducer of the present disclosure provides a long term and reliable solution to the problem of impact shock in a drainage stack.

SUMMARY

In an exemplary embodiment, an impact reducer for drainage stacks is described, comprising a first pipe section with a first internal passage having at least five alternating bends along its longitudinal axis, a bypass vent in a second pipe section having a second internal passage parallel to the longitudinal axis. A clean out plug is formed in a third pipe section having a third internal passage at a radial angle with the longitudinal axis. The clean out plug has a threadable, removable cover.

A first end fitting is located at an upstream location of the impact reducer and a second end fitting located at a downstream location of the impact reducer.

In another exemplary embodiment, a method for reducing the impact of turbulent, falling water upon a bend fitting at the downstream end of a drainage stack. The method comprises installing an impact reducer having at least five alternating bends and a bypass vent in the drainage stack above the bend fitting, wherein passing the turbulent, falling water through the impact reducer reduces the momentum and kinetic energy of the falling water, and converts the turbulent flow of the water to a laminar flow, and wherein air in the impact reducer is forced into the bypass vent.

In a third exemplary embodiment, a method of manufacturing an impact reducer includes machining two halves of a split metal block to form a mold of the impact reducer, the mold configured for forming a first internal passage having at least five alternating bends along a longitudinal axis of each metal block; a bypass vent in a second internal passage parallel to the longitudinal axis, a first end of the bypass vent connecting to the first internal passage between a first end of the first internal passage and a first bend; a second end of the bypass vent connecting to the first internal passage between fifth bend and a second end of the first internal passage; a clean out plug in a third internal passage connected to the first internal passage at a location between a second bend and a third bend, the third internal passage extending at an angle with the longitudinal axis of the first internal passage. The method includes closing the two halves of the mold, injecting plastic into the mold, cooling the mold and removing the impact reducer.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
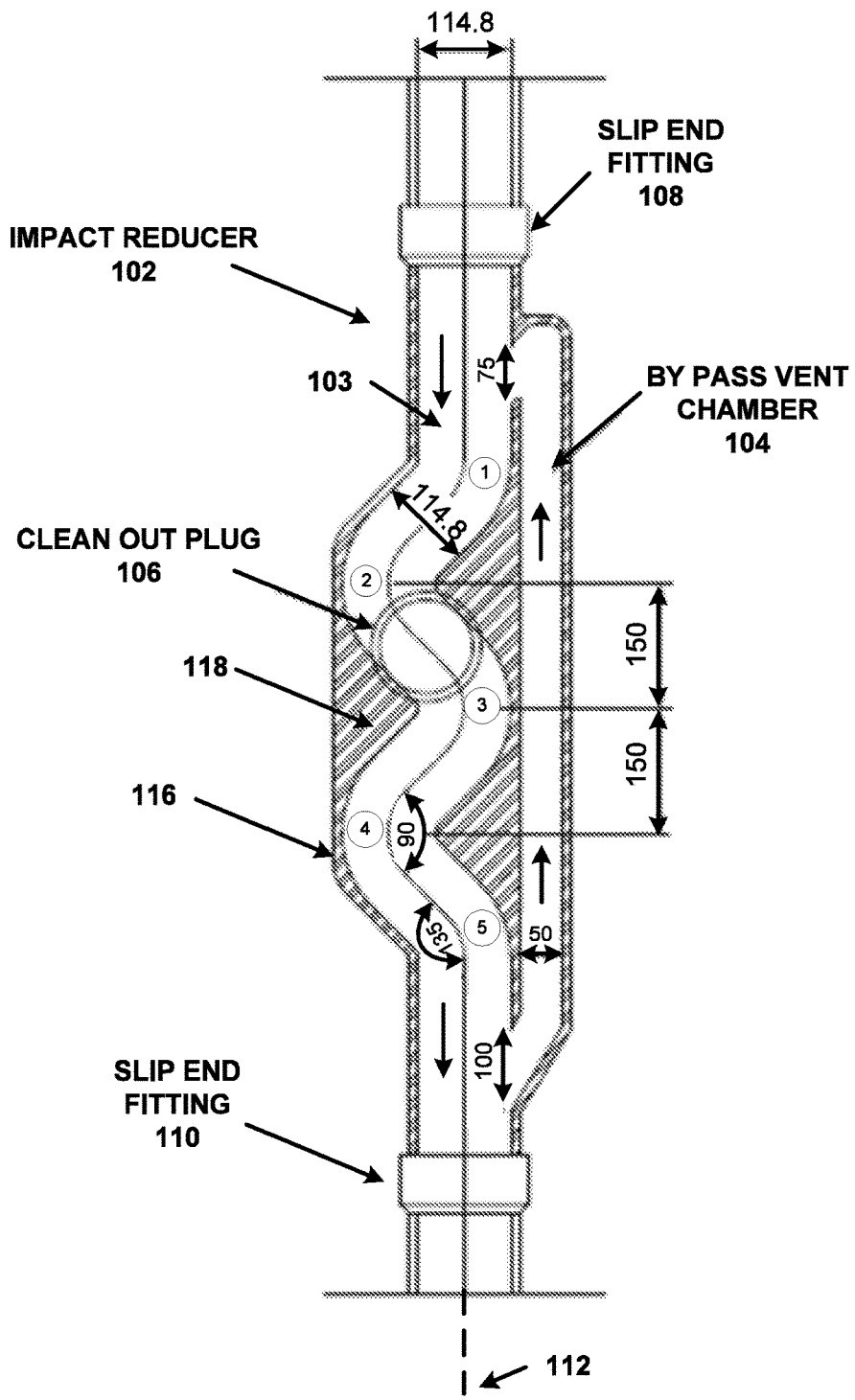
FIG. 1 is an illustration of the impact reducer, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to an impact reducer for drainage stacks, a method for reducing the impact of turbulent, falling water upon a bend fitting at the downstream end of a drainage stack and a method of manufacturing an impact reducer.

The present disclosure describes an impact reducer for drainage stacks (i.e., vertical pipes) in plumbing systems to solve the very common and frequently occurring problem of leakage of pipe fittings at the bottom of the stacks due to heavy impact of water falling in the stacks in high rise buildings. The impact reducer of the present disclosure is easy to install and is effective in reducing the impact at the bottom of the drainage stacks, thus reducing the risk of leakage or pipe breakage.

In an aspect, the impact reducer may be installed at the base of the stack just before the location where a pipe changes its direction from vertical to horizontal. While passing through the impact reducer, the water inside the pipe experiences a zig zag path due to several curves which act as an obstruction to the straight path of water, causing the turbulent rushing water to lose momentum and kinetic energy. This reduction in momentum and kinetic energy of the rushing water results in bringing the turbulent water to a preferably laminar flow condition and reduces the impact shock of water striking at the base of the stack. Additionally, the impact reducer decreases the burden on a pipe hanging system, as the decrease in turbulence reduces movement of the pipes and stress on the hangers. After passing through the impact reducer, the water moves into the long radius bend at the bend fitting with reduced impact, thus entering the horizontal section of the pipe in a laminar flow condition without creating a hydraulic jump.

The impact reducer compensates for negative pressure developed inside the pipe by including a bypass vent chamber. Negative pressure which develops at the exit of impact reducer will suck the air through the bypass vent chamber, thus resulting in a smooth flow without risk of blockage. The direction of attachment of this bypass vent to the impact reducer is opposite to the direction of flow of water in the stack. At the inlet and outlet, this connection attaches with its mouth downwards. This shape denies the entry of water into the by-pass chamber, leaving it for the passage of air and relief of any negative pressure developed inside the stack.

Figure 2:
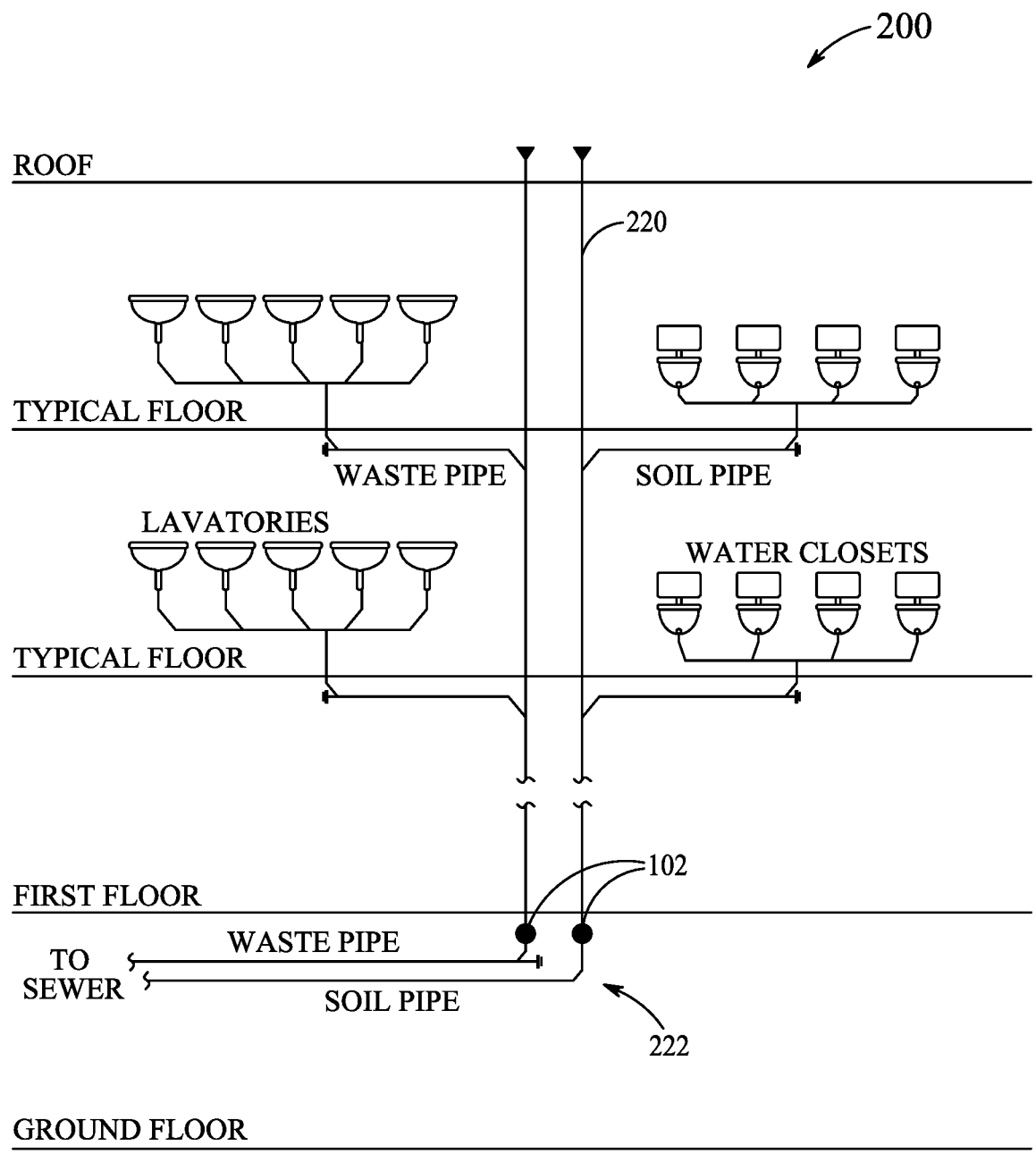
FIG. 2 is an illustration of the location for the installation of an impact reducer in a drainage stack, according to certain embodiments.
Figures 3A, 3B:
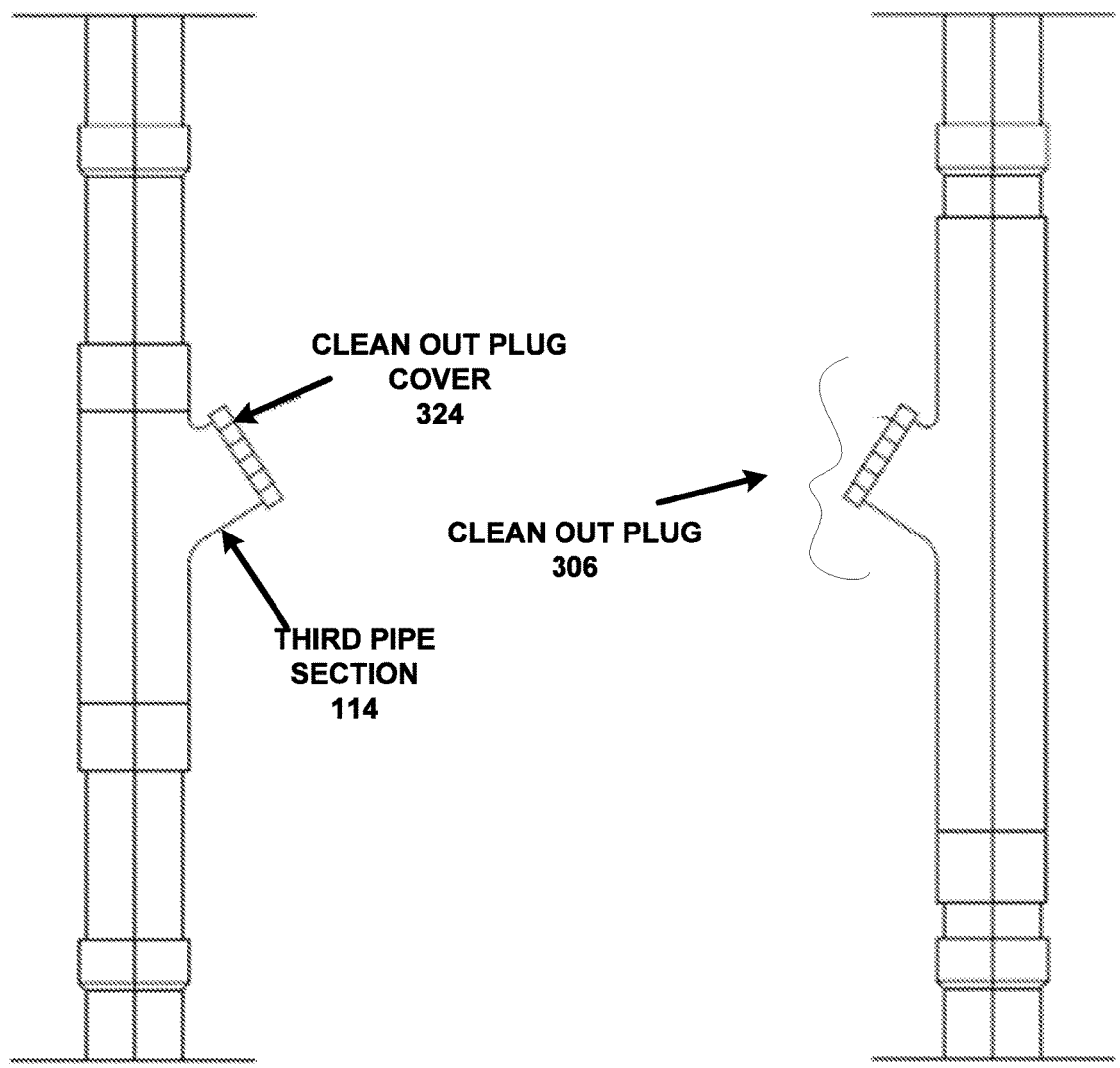
FIG. 3A is a left side elevation view of the impact reducer cleanout plug, according to certain embodiments.
FIG. 3B is a right side elevation view of the impact reducer cleanout plug, according to certain embodiments.

FIG. 1, 3A, 3B illustrate the impact reducer in right side, front, and left side views respectively. FIG. 3B shows dimensions for the non-limiting example of a 110 mm diameter pipe. Larger diameter pipes can be produced with the same proportions. FIG. 2 shows the location an impact reducer is installed in a drainage stack.

Drainage stack pipes have diameters ranging from 30 mm to 400 mm, but are most commonly found in the range of 50 mm to 150 mm. The diameter of the drainage stack is related to the stack height. For example, a stack less than 22 meters may have a drainage stack diameter of about 76 mm or greater, a stack between 22 meters and about 500 mm should have a drainage pipe diameter greater than or equal to 100 mm, and stacks greater than 500 mm should have drainage pipe diameters greater than or equal to about 130 mm.

The impact reducer is applicable to waste water, soil water and storm/rain water plastic pipe stacks. Plastic pipes may be any one of unplasticized polyvinyl chloride (uPVC), post chlorinated polyvinyl chloride (CPVC), acrylonitrile butadiene styrene (ABS), polybutylene (PB-1), polypropylene (PP), polyethylene (PE), polyvinylidene fluoride (PVDF), and variants of the listed plastics.

The impact reducer of the present disclosure has several parts, referred to as primary and secondary components.

Primary Component

While passing through impact reducer, the water inside the pipe experiences a zig-zag path consisting of smooth bends (preferably about 90 degrees each with respect to the longitudinal axis), which act as an obstruction in the straight path of vertically falling water causing it to lose its momentum and kinetic energy. The angle of entry and exit is preferably about 135 degrees with respect to the longitudinal axis at both the inlet and the outlet respectively. This reduction in momentum and kinetic energy of water results in converting the turbulent flow of the falling water to a preferably laminar flow condition, which reduces the impact of water at the base of the stack and relieves the burden on the pipe hanging system. After passing through the impact reducer, the water flows into a long radius bend with reduced impact and thus enters the horizontal pipe as a laminar flow without creating a hydraulic jump.

The water entering the impact reducer is assumed to be travelling at a terminal velocity which is given by the following equation:

$$Vt = k\left(\frac{Q}{D}\right)^{\frac{2}{5}},$$

where Q is the flow of sludge or waste water, in gallons per minute or liters per second, entering the impact reducer at any instant, d is the internal diameter of the stack in inches or mm, and k is a constant equal to 3.0 in the foot/lb/s and 10.073 in SI units.

The force of impact experienced by the impact reducer can be given by the following equation: $Fi=\rho Q(Vt-Vo \cos\theta)$, where $\rho$ is the density of sludge or waste water travelling in the drainage stack, Q is the flow of the water, $\theta$ is the change in the direction of flow caused by the angle of a bend and Vo is the velocity of flow after collision with the first bend. $V_O$ may be calculated by the following equation:

$$Vo=\sqrt{(Vo\cos\theta)^2+(Vo\sin\theta)^2}$$

Secondary Components

The secondary components include a by-pass vent chamber, a cleanout plug and slip end fittings.

The bypass vent chamber eliminates the negative pressure developed inside the pipe. Negative pressure which develops at the outlet of the impact reducer conveys the air through the bypass vent from the inlet side of the fitting, resulting in a smooth flow without risk of blockage. The direction of attachment of this bypass vent with the impact reducer is opposite to the direction of flow of water in the stack. At the inlet, the mouth of the bypass vent chamber is directed downwards. At the outlet, the mouth of the bypass vent chamber is directed upward.

An optional cleanout plug with a threaded rotatable cover is formed on one side of the impact reducer. The cleanout plug provides access to the inside the pipe fitting for cleaning should the impact reducer become clogged.

Optional slip end fittings are used on either end of the impact reducer to mate the device to the existing drainage pipe. In conventional use, the inner diameter of the slip end is the same as the outer diameter of the impact reducer and the drainage pipe. The slip end fitting slides over the impact reducer to cover the end of the drainage pipe. The inner surface of the slip end fitting and the outer surface of the drainage pipe and impact reducer section to be covered by the slip end fitting must be coated with a PVC primer and a PVC cement. The primer softens the inside of the fitting, preparing it to bond, while the cement keeps the two pieces bonded together tightly.

In non-limiting examples, the cement and primer can be any one of the 705 PVC cement, 711 PVC, 719 PVC, 724 CPVC and PVC, 729 CPVC, and P-70 Primer available from Weld-On. (See "Industrial Grade Cements & Primers Specification Guide", 2016, pages 6-13, Weld On, 455 W. Victoria Street, Compton, Calif. 90220 U.S.A., incorporated herein by reference in its entirety).

Manufacturing the impact reducer for drainage stacks is very simple as it does not consist of complicated parts or any internal components. Although the most common material of plastic pipes is PVC, the impact reducer may be made from any of the following materials conforming to the respective standards/specifications as mentioned in Table 1. (See "International Plumbing Code (2018 Edition)", International Code Council, USA). The material of the impact reducer should be matched to the material of the drainage pipe for best results.

TABLE 1

Materials for Impact Reducer Fitting

| Sr. No. | Material of Impact Reducer | Conforming Standards/ Specifications |
| --- | --- | --- |
| 1 | Acrylonitrile Butadiene Styrene (ABS) - Plastic | ASTM D2661; ASTM F628 |
| 2 | Polyvinyl Chloride (PVC) - Plastic | ASTM D2665; ASTM F1866 |
| 3 | Polyvinylidene Fluoride (PVDF) - Plastic | ASTM F1673 |
| 4 | Polyethylene (PE) - Plastic | ASTM D2683 |

FIG. 1B is a non-limiting example of an impact reducer used in a PVC pipe system having an internal diameter of 6 in. (114.8 mm) based on standard dimensions provided in ASTM D2665. (See "Standard Specification for Poly(Vinyl Chloride) (PVC) Plastic Drain, Waste, and Vent Pipe and Fittings", ASTM International, February 2004, pages 1-7, 100 Barr Harbor Drive, PO Box C700, West Conshohocken, Pa. 19428-2959, U.S.A., incorporated herein by reference in its entirety). The impact reducer of the present disclosure is not limited to the dimensions shown in FIG. 1B. The dimensions of the impact reducer should be tailored to match the drainage pipe dimensions. Attention must be paid to the height of the drainage pipe, the expected volume of water and hence the speed of the water as it impinges upon the impact reducer. For long drainage stacks in commercial buildings, an impact reducer may be installed upon the drainage stack above the elbow bend. The impact reducer may be fastened by hangers to the ceiling of the ground or basement floor ceiling in line with the drainage stack.

The advantages of using the impact reducer fitting of the present disclosure are:

1. Increased life of pipe bend and fittings at the bottom of stack.

2. No need for additional brackets or pipe clamps to hold the pipe fittings at the bottom of stack.

3. Reduction in noise of water caused at the pipe bend as the water would travel more smoothly and with reduced impact when it hits the drainage stack lower bend area.

4. Easy installation as the impact reducer preferably matches to the pipe material and diameter.

5. Easy cleanout at the optional removable threaded cover of the cleanout plug in the event of a clog.

The impact reducer can be manufactured by injection molding. In injection molding, plastic material is fed from a hopper into a melting section of an injection-molding machine. After melting, the material is transported forward by a screw and homogenised before being injected into a mold to form the shape of the desired product. In the cooling step, the plastic solidifies. Then the mold is opened and the product is removed.

A mold for the impact reducer can be formed by machining two halves of a split metal block to form a first internal passage having at least five alternating bends along its longitudinal axis; a bypass vent in a second internal passage parallel to the longitudinal axis, a first end of the bypass vent connecting to the first internal passage between a first end of the first internal passage and a first bend; a second end of the bypass vent connecting to the first internal passage between fifth bend and a second end of the first internal passage; a third internal passage connected to the first internal passage at a location between a second bend and a third bend, the third internal passage extending at an angle with the longitudinal axis of the first internal passage to form a clean out plug port.

After injection and opening the mold, threads are formed at the outer end of the clean out plug and a threaded cap is installed on the threaded end. Slip end fittings are placed over the first and second end of the impact reducer to enable installation of the impact reducer on a drainage pipe.

The first embodiment is shown with respect to FIGS. 1, 2, 3A, 3B. The first embodiment describes an impact reducer 102 for drainage stacks 220, comprising a first pipe section 103 with a first internal passage having at least five alternating bends along its longitudinal axis 112; a bypass vent 104 in a second pipe section having a second internal passage parallel to the longitudinal axis; and a clean out plug 106 in a third pipe section 114 having a third internal passage at a radial angle with the longitudinal axis.

To connect the impact reducer to the drainage stack, end fittings are placed on the impact reducer. A first end fitting 108 is located at an upstream location of the impact reducer and a second end fitting 110 is located at a downstream location of the impact reducer.

In an aspect, the impact reducer may include an outer housing 116 forming a cavity which includes the first 103, second 104 and third 114 internal passages, wherein the cavity further includes insulation 118 filling the cavity around the first and second internal passages.

The five alternating bends represent a change of at least 80 degrees with respect to the longitudinal axis of the first internal passage. The bends may range from 80 degrees to 140 degrees, more preferably either 90 degrees or 135 degrees.

The impact reducer 102 is installed within a drainage stack 220 before a bend 222 at the bottom of the drainage stack. The impact reducer is preferably connected to the drainage stack by slip end fittings.

The second internal passage having a bypass vent 104 has a shape which forms a fin structure with respect to the first internal passage.

The impact reducer further includes a clean out plug cover 324, wherein the clean out plug has male threads and the clean out plug cover has female threads.

The first internal passage 103 has a diameter, d, which should preferably match the diameter of the drainage stack 220 pipe. The second internal passage 104 has a diameter equal to about 0.43 d; and the openings between the first internal passage and the second internal passage are about 0.65 d at the upstream end and about 0.85 d at the downstream end respectively.

In a non-limiting example shown in FIG. 1, the diameter of the first internal passage is 114.8 mm, which is a standard drainage pipe diameter. The second internal passage has a diameter of 50 mm, the opening at the upstream end is 75 mm and the opening at the downstream end is 100 mm. These dimensions will vary depending on the diameter of the drainage pipe, and the diameter of the first internal passage of the impact reducer should be chosen to match the diameter of the drainage stack.

The at least five alternating bends include a first bend (1), a second bend (2), a third bend (3), a fourth bend (4) and a fifth bend (5). The first bend (1) is located between the first end fitting 108 and the second bend (2), The curvature of the first bend represents a change of 135 degrees in the axis of the first internal passage and extends in a first direction (shown as towards the left in FIG. 1). The second bend (2) is located between the first bend (1) and the third bend (3), wherein the curvature of the second bend represents a change of 90 degrees in the axis of the first internal passage and extends in a second direction opposite the first direction (shown as bending towards the right in FIG. 1). The third bend (3) is located between the second bend (2) and the fourth bend (4), wherein the third bend represents a change in curvature of 90 degrees with respect to the longitudinal axis of the first internal passage and extends in the first direction (shown as towards the left in FIG. 1). The fourth bend (4) is located between the third bend (3) and the fifth bend (5), wherein the curvature of the fourth bend represents a change of 90 degrees with respect to the longitudinal axis of the first internal passage and extends in the second direction (shown as towards the right in FIG. 1). The fifth bend (5) is located between the fourth bend (4) and the second end fitting 110, wherein the curvature of the fifth bend represents a change of 135 degrees with respect to the longitudinal axis of the first internal passage and extends in the direction of the longitudinal axis 112.

The bends are spaced so that for a first internal passage having a diameter, d, the distance between the second bend and the fourth bend is about 2.6 d. In a non-limiting example shown in FIG. 1, the distance between the second bend is 300 mm.

In general, the distance between the first and second bend, the second and third bend, the third and fourth bend and the fourth and fifth bend is two to four times an inner diameter of the first internal passage.

The impact reducer of the present disclosure is not limited to having only five alternating bends. The second and third bends can be duplicated such that there are seven, nine or more alternating bends. However, due to clearance restraints, the maximum number of 90 degree bends may be limited to three.

The bypass vent connects to the first internal passage 103 between the first end fitting 108 and the first bend (1), extends towards the upstream end and then bends towards the downstream end. This is shown in FIG. 1 by the slight upward curvature of the bypass vent chamber 104, which then bends downward. As mentioned above, the opening between the first and second passages at the upstream end is about 0.65 d. In the non-limiting example of FIG. 1, this opening may be 75 mm.

The location of the clean out plug 106 may located between second bend (2) and the third bend (3), may be located between third bend (3) and the fourth bend (4). If the clean out plug 106 is located between second bend (2) and the third bend (3), there may be a second clean out plug located between the third bend (3) and the fourth bend (4).

The second embodiment is drawn to a method for reducing the impact of turbulent, falling water upon a bend fitting at the downstream end of a drainage stack and is shown in FIGS. 1, 2 and 3A, 3B.

The method includes installing an impact reducer 102 having at least five alternating bends (1, 2, 3, 4, 5) and a bypass vent 104 in the drainage stack 220 above the bend fitting 222, wherein passing the turbulent, falling water through the impact reducer 102 reduces the momentum and kinetic energy of the falling water, converts the turbulent flow of the water to a laminar flow, and wherein air in the impact reducer is forced into the bypass vent 104.

The method includes passing the turbulent, falling water through the at least five alternating bends of the impact reducer, wherein the at least five alternating bends include a first bend (1), a second bend (2), a third bend (3), a fourth bend (4) and a fifth bend (5), the first bend changing the angle of the flow by 135 degrees in a first direction, the second bend changing the angle of the flow by 90 degrees in a second direction opposite direction the first direction, the third bend changing the angle of the flow by 90 degrees in the first direction, the fourth bend changing the angle of the flow by 90 degrees in the second direction, and the fifth bend changing the angle of the flow by 135 degrees in the first direction, such that the flow extends in the direction of a longitudinal axis of the impact reducer.

Figure 4:
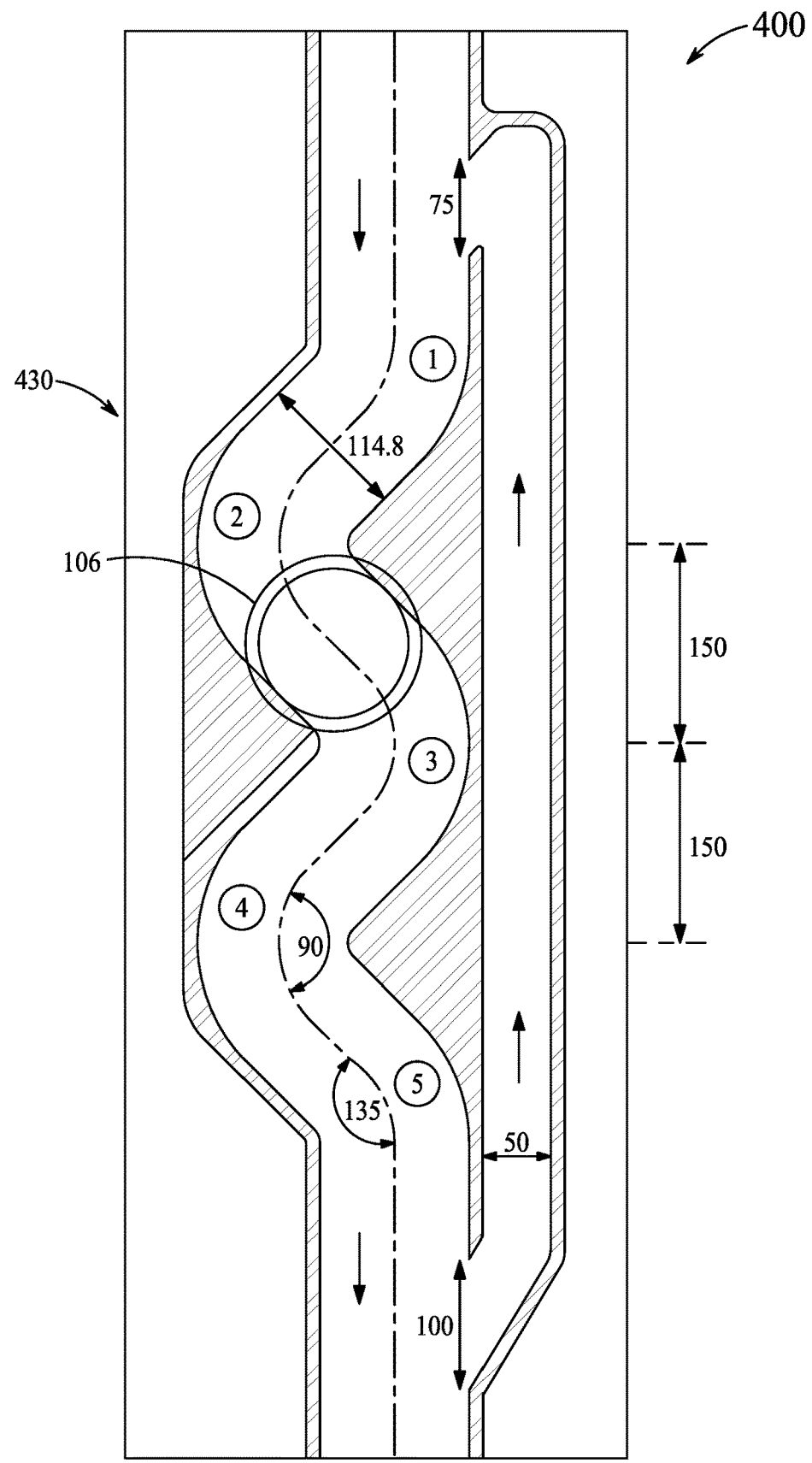
FIG. 4 is an exemplary half of a metal mold block for the impact reducer, according to certain embodiments.
Figure 5:
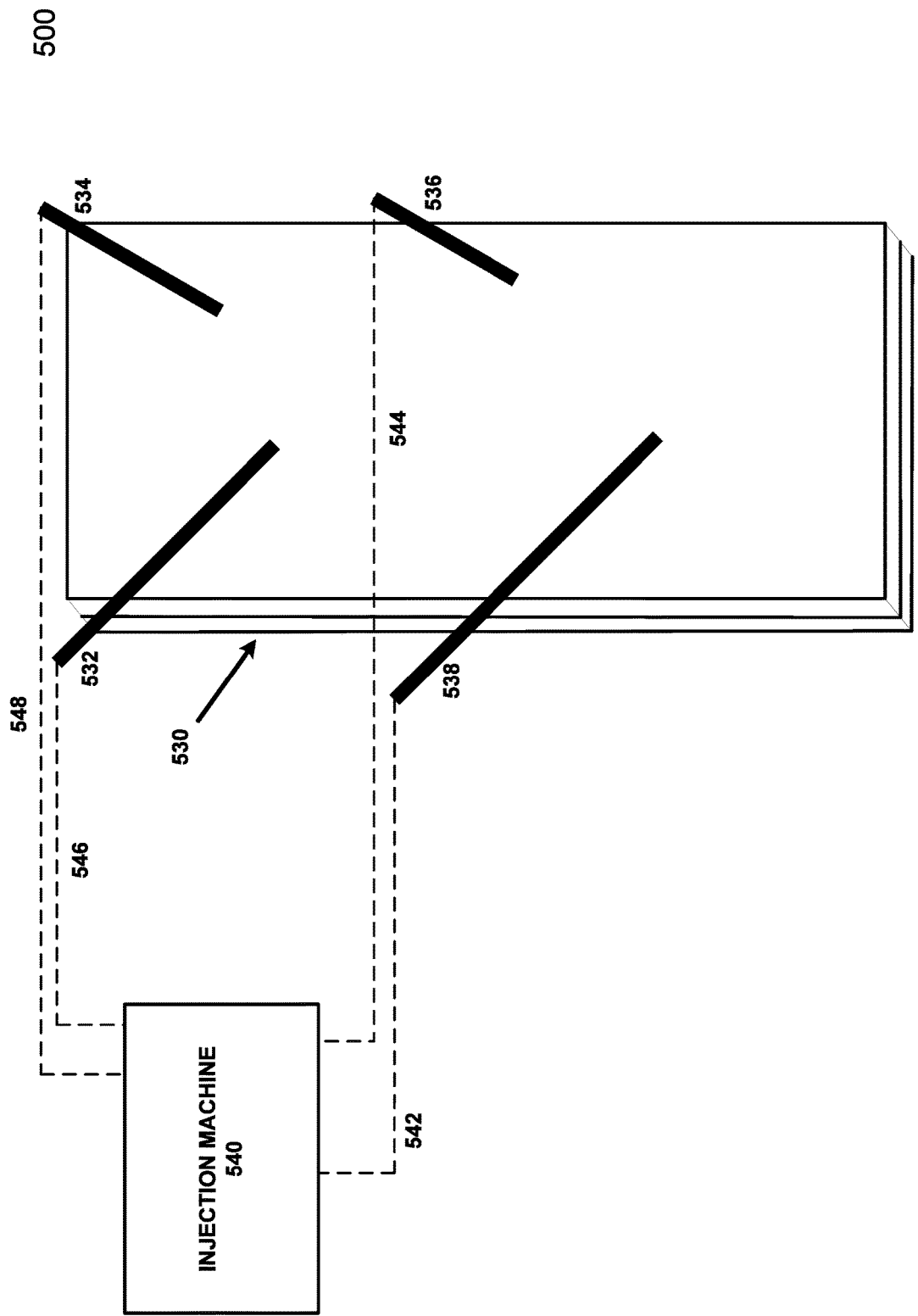
FIG. 5 is an exemplary use of injection molding to manufacture the impact reducer, according to certain embodiments.

The third embodiment is drawn to a method of manufacturing an impact reducer 102. The impact reducer is shown in FIG. 1 and one half of the mold 430 is shown in FIG. 4 with angles and dimensions. The clean out plug extends through the back of the mold. The other side of the mold (not shown) would be a mirror image of the demonstrated side, except that the clean out plug would not extend through the mold. The closed mold with injection ports 532, 534, 538, 536 is shown in FIG. 5. Injection machine 540 is shown connecting injectors (dashed lines 542, 544, 546, 548) to the injection ports. The method of manufacturing includes machining two halves of a split metal block to form a mold 430 of the impact reducer, the mold configured for forming a first internal passage 103 having at least five alternating bends (1, 2, 3, 4, 5) along a longitudinal axis of each metal block; a bypass vent 104 in a second internal passage parallel to the longitudinal axis, a first end of the bypass vent connecting to the first internal passage between a first end of the first internal passage and a first bend; a second end of the bypass vent connecting to the first internal passage between fifth bend and a second end of the first internal passage; a clean out plug 106 in a third internal passage connected to the first internal passage at a location between a second bend and a third bend, the third internal passage extending at an angle with the longitudinal axis of the first internal passage.

The method for manufacturing includes closing the two halves of the mold (the closed mold 530 is shown in FIG. 5), injecting plastic into the mold (using the injection machine 540), cooling the mold and removing the impact reducer. The plastic can be any one of ABS, PVC, PVDF and PE.

The method for manufacturing includes completing the impact reducer by forming, using a pipe threading machine, threads on the outer surface of the end of clean out plug; and installing a threaded cover on the end of the clean out plug.

The method for manufacturing includes installing a slip end fitting on the each of the first end and the second end of the first internal passage.

Obviously, numerous modifications and variations of the present invention are possible in light of the above teachings. It is therefore to be understood that within the scope of the appended claims, the invention may be practiced otherwise than as specifically described herein.

The invention claimed is:

1. An impact reducer for drainage stacks, comprising:
a longitudinal axis, a first end and a second end;
a first internal passage parallel to the longitudinal axis, the first internal passage having at least five alternating bends extending between the first end and the second end;
a second internal passage parallel to the longitudinal axis, wherein a first opening to the second internal passage is connected to the first internal passage at the first end and a second opening to the second internal passage is connected to the first internal passage at the second end, the second internal passage configured to form a bypass vent which transfers air from the second end of the first internal passage to the first end of the first internal passage;
a third internal passage connected to the first internal passage at a radial angle with the longitudinal axis;
an outer housing forming an interior cavity which includes the first, second and third internal passages, wherein a clean out plug connected to the third internal passage extends through the outer housing;
a threaded cover removably connected to the clean out plug;
noise absorbing insulation which fills the cavity between the outer housing and the internal passages;
a first end fitting located at the first end; and
a second end fitting located at the second end.

2. The impact reducer for drainage stacks of claim 1, wherein each bend represents a change of at least 90 degrees with respect to the longitudinal axis of the first internal passage.

3. The impact reducer for drainage stacks of claim 1, wherein the impact reducer is installed within a drainage stack before a curve at the bottom of the drainage stack.

4. The impact reducer of claim 1, wherein the clean out plug has male threads and the threaded cover has female threads.

5. The impact reducer of claim 1, wherein the first end fitting and the second end fitting are slip end fittings.

6. The impact reducer of claim 1, wherein:
the first internal passage has a diameter, d,
the second internal passage has a diameter equal to about 0.43d;
the first opening between the first internal passage and the second internal passage is about 65d; and
the second opening between the first internal passage and the second internal passage is about 0.85d.

7. The impact reducer for drainage stacks of claim 6, wherein the at least five alternating bends include a first bend, a second bend, a third bend, a fourth bend and a fifth bend;
the first bend located between the first end fitting and the second bend, wherein the first bend represents a change of 135 degrees with respect to the longitudinal axis of the first internal passage and extends in a first direction;

the second bend located between the first bend and the third bend, wherein the second bend represents a change of 90 degrees with respect to the longitudinal axis of the first internal passage and extends in a second direction opposite the first direction;

the third bend located between the second bend and the fourth bend, wherein the third bend represents a change of 90 degrees with respect to the longitudinal axis of the first internal passage and extends in the first direction;

the fourth bend located between the third bend and the fifth bend, wherein the fourth bend represents a change of 90 degrees with respect to the longitudinal axis of the first internal passage and extends in the second direction; and the fifth bend located between the fourth bend and the second end fitting, wherein the fifth bend represents a change of 135 degrees with respect to the longitudinal axis of the first internal passage and extends in the direction of the longitudinal axis.

8. The impact reducer of claim 7, wherein:
the first internal passage has a diameter, d, and
the distance between the second bend and the fourth bend is about 2.6d.

9. The impact reducer of claim 7, wherein a distance between the first and second bend, the second and third bend, the third and fourth bend and the fourth and fifth bend is two to four times an inner diameter of the first internal passage.

10. The impact reducer of claim 7, wherein:
the second internal passage extends above the first opening; and
the second internal passage extends at an angle towards the second opening, wherein the angle is in the range of 20 degrees.

11. The impact reducer of claim 7, wherein the clean out plug is located between second bend and the third bend.

12. The impact reducer of claim 7, wherein the clean out plug is located between third bend and the fourth bend.

13. A method for reducing the impact of turbulent, falling water upon a bend fitting at a downstream end of a drainage stack, comprising:
installing an impact reducer on the drainage stack above the bend fitting, the impact reducer having an outer housing forming an interior cavity having a first end and a second end, the interior cavity including:
a first internal passage having at least five alternating bends extending between the first end and the second end, wherein the at least five alternating bends include a first bend, a second bend, a third bend, a fourth bend and a fifth bend,
a second internal passage parallel to the first internal passage, wherein a first opening to the second internal passage is connected to the first internal passage at the first end and a second opening to the second internal passage is connected to the first internal passage at the second end, wherein the second internal passage is configured to form a bypass vent which transfers air from the second end of the first internal passage to the first end of the first internal passage,
a third internal passage connected to the first internal passage at a radial angle to the first internal passage, the third internal passage extending through the outer housing and configured to form a clean out plug on the outer housing, and
noise reducing insulation filling the cavity between the outer housing and the internal passages;

wherein passing the turbulent, falling water through the impact reducer reduces momentum and kinetic energy of the falling water, converting the turbulent flow of the water to a laminar flow, and forcing-air in the impact reducer into the bypass vent.

14. A method of manufacturing an impact reducer, comprising:
machining two halves of a split metal block to form a mold of the impact reducer, the mold including:
a housing having a cavity including first, second and third internal passages;
the first internal passage having at least five alternating bends along a longitudinal axis of each metal block, wherein the at least five alternating bends include a first bend, a second bend, a third bend, a fourth bend and a fifth bend;
the first bend located between a first end of the housing and the second bend, wherein the first bend represents a change of 135 degrees with respect to the longitudinal axis of the first internal passage and extends in a first direction;
the second bend located between the first bend and the third bend, wherein the second bend represents a change of 90 degrees with respect to the longitudinal axis of the first internal passage and extends in a second direction opposite the first direction;
the third bend located between the second bend and the fourth bend, wherein the third bend represents a change of 90 degrees with respect to the longitudinal axis of the first internal passage and extends in the first direction;
the fourth bend located between the third bend and the fifth bend, wherein the fourth bend represents a change of 90 degrees with respect to the longitudinal axis of the first internal passage and extends in the second direction; and
the fifth bend located between the fourth bend and a second end of the housing, wherein the fifth bend represents a change of 135 degrees with respect to the longitudinal axis of the first internal passage and extends in the direction of the longitudinal axis;
the second internal passage parallel to the longitudinal axis, the second internal passage configured to form a bypass vent, a first opening of the bypass vent connecting to the first internal passage between a first end of the first internal passage and the first bend; a second opening of the bypass vent connecting to the first internal passage between the fifth bend and a second end of the first internal passage;
a third internal passage connected to the first internal passage at a location between a second bend and a third bend, the third internal passage extending at a radial angle with the longitudinal axis of the first internal passage, a portion of the third internal passage extending through the housing;
closing the two halves of the mold;
injecting plastic into the mold;
cooling the mold;
removing the impact reducer; and
filling the cavity between the outer housing and the internal passages with noise absorbing insulation.

15. The method of manufacturing an impact reducer of claim 14, further comprising:
forming, using a pipe threader, threads on the portion of an outer surface of the third internal passage which extends through the housing; and
installing a threaded cover on the end of the portion.

16. The method of manufacturing an impact reducer of claim 14, further comprising:

installing a slip end fitting on the each of the first end and the second end of the first housing.

\* \* \* \* \*